Sept. 9, 1941.     C. SPAETH     2,255,369
SAMPLING DEVICE FOR LIQUID STORAGE SYSTEMS
Filed Sept. 28, 1939
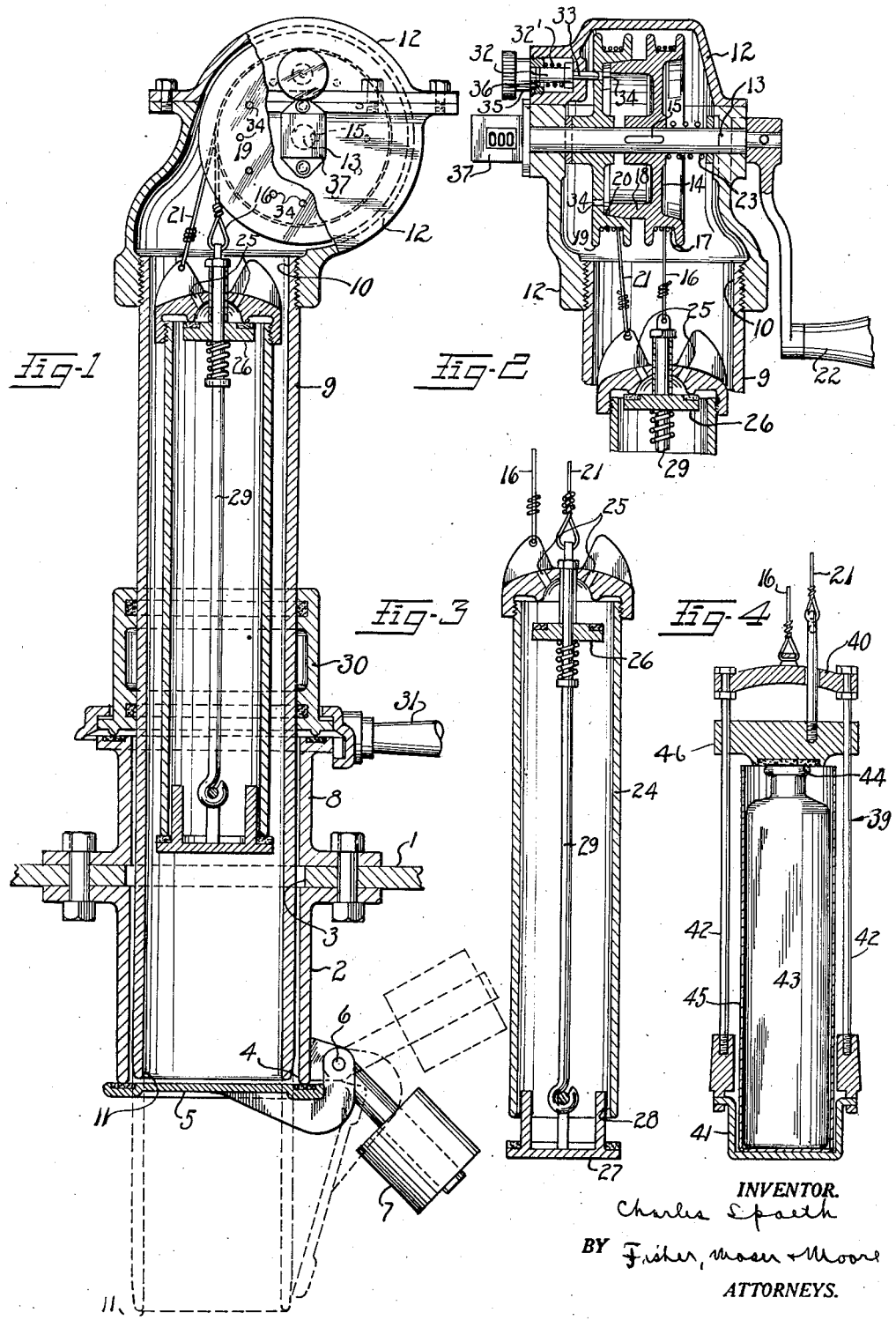
INVENTOR.
Charles Spaeth
BY Fisher, Mason + Moore
ATTORNEYS.

Patented Sept. 9, 1941

2,255,369

UNITED STATES PATENT OFFICE 2,255,369

SAMPLING DEVICE FOR LIQUID STORAGE SYSTEMS

Charles Spaeth, Cleveland, Ohio

Application September 28, 1939, Serial No. 296,983

2 Claims. (Cl. 137—18)

This invention relates to sampling devices for liquid storage systems.

The principal object of the present invention is to provide a vapor tight sampling device for taking representative samples of gasoline or the like in storage tanks.

Another object is the provision of a vapor tight sampling device, particularly adapted for use with storage systems, having a novel hoisting and valve controlling mechanism.

These and other objects and advantages will be apparent as the specification is considered with the accompanying drawing, in which Figure 1 is a side elevation, partly in section, of the sampling device;

Figure 2 is a cross section through the housing, showing the raising, lowering, and holding drums, and operating mechanism therefor;

Figure 3 is a section through the sampler container; and

Figure 4 is a section through a modified form of sampler container.

Referring more particularly to the drawing, wherein like reference characters designate similar parts throughout the several views, the numeral 1 denotes a top or manhole cover of a storage tank, for gasoline or similar liquids, shown only in section. A downwardly depending collar 2 is positioned beneath an opening 3 in the cover 1 and is suitably secured thereto. The lower open end 4 of the collar is provided with a valve 5, pivoted thereto, as at 6, which is formed with a counterbalance or weight 7, extending from the side thereof for normally keeping the valve 5 in closed position relative to the open end of the collar. An upstanding flange or collar 8 is also positioned over the opening 3 and suitably secured to the cover 1.

A tube or casing 9, of the desired length, having open upper and lower ends 10 and 11, respectively, has a housing 12 threaded or otherwise suitably secured to the upper end thereof. Extending transversely through and journalled in the housing 12 is a crank shaft 13 having a hoisting and lowering drum 14 keyed thereto, as at 15. A line or cable 16 is attached to the drum 14 and is adapted to be wound in a groove 17. The drum is formed with a laterally extending clutch or slip flange 18 which fits beneath and frictionally engages a clutch or flange 20, on a holding and opening drum 19 having a line or cable 21 secured thereto and wound therearound. The drum 19 is loosely mounted on the crank and the extended outer end of the latter is provided with a handle 22. A coil spring 23, mounted on the shaft 13, engages, at its ends, the hoisting drum 14 and the side wall of the housing 12, so that when the handle 22 and the shaft are rotated, in a counterclockwise direction, the clutch 18 is forced into gripping engagement with clutch 20 of the drum 19 and the two drums are rotated as a unit in the same direction, by handle 22, as hereinafter described. A spring tensioned locking pin 32 preferably extends through a hole 33 in the side wall of the housing 12 and is adapted to fit into one of a series of holes 34, in the side wall of the drum 19, to lock the drum 19 and interconnected drum 14 against rotary movement, for a purpose presently set forth. A pin 35, movable in a key way 36 in hole 33, serves to normally hold the locking pin 32 out of operative engagement with drum 19.

Connected to and suspended from the lower end of the line or cable 21 is a sampling tube or container 24. The upper end of this container is provided with suitable inlets or openings 25 which are normally closed by a spindle valve 26, positioned within the upper end of the container and suspended from the lower end of the line or cable 16. A second valve 27, seated within the open lower end 28 of the container, is connected to the spindle valve 26 by a rod 29, whereby both valves are operated simultaneously.

A packing sleeve 30 is positioned on the casing 9 and, when it is desired to take a sample of the gasoline in the tank, the casing is inserted and lowered through the opening 3 in the manhole cover 1 until the lower edge of the packing sleeve 30 abuts the upper end of the collar 8. The sleeve and collar are then clamped together by any suitable locking means, such as a cam lever or clamp 31. The casing is thereafter pushed downwardly through the packing sleeve until the open end 11 thereof engages and pushes the valve 5 downwardly, against the action of the weight 7, into open position as shown in dotted lines in Figure 1. The sampling container 24 is then in position to be lowered into the tank. By rotating the crank shaft 13, in a counterclockwise direction, by means of the handle 22, the hoisting and holding drums 14 and 19 are rotated and the lines 16 and 21 are unwound therefrom and the container 24 is lowered through the opening 11 into the tank. A conventional counter or register 37, is suitably mounted on the end of crank shaft 13 and is geared to register the depth in feet to which the container is lowered. When the desired stratum of gasoline, to be tested, is reached, the locking pin 32 is actuated so that the pin 35 thereon is moved inwardly, through the keyway 36, by the action of spring 32', until the inner end of the pin 32 extends into one of the holes 34 in and locks the drum 19 and drum 14 against further movement. The movement of the shaft 13 is continued, approximately one eighth of a revolution in the same counterclockwise direction, thus rotating the clutch 18 and drum 14 relatively to the locked drum 19. This last mentioned movement of the drum 19 lowers the line 16 a sufficient distance to permit of the top spindle valve 26 and the bottom valve 27 to be dropped or moved downwardly away from the respective valve openings 25 and 28, in the container 24. During this movement of line 16, the container is supported by line 21 from drum 19. In this position, as shown in Figure 2, gasoline enters through the open top and bottom valve openings 25 and 28 and fills the container 24.

In order to close the valve openings, the locking pin 32 is moved out of locking engagement with the hole 34, in the holding drum 19. This releases the drum so that the weight of the filled container 24 causes the drum 19 to slip, relative to the drum clutch 18, thereby unwinding or releasing the holding line 21 and lowering the container until the openings 25 and 28 therein are again sealed by the respective valves 26 and 27, which have been suspended, during this movement, by the hoisting line 16. The filled container is now ready to be raised, and the crank handle 22 and shaft 13 are now rotated in a reverse or clockwise direction and the line 16 is wound upon the hoisting drum 14 and the container is raised to its normal elevated, or Figure 1 position. The clamp 31 is then manually released and the packing sleeve 30 and casing 9 are lifted upwardly through the valve opening 11 and the valve 5 returns to closed position, by virtue of the counterweight 7. The manhole cover opening 3 is closed and the filled container is then removed from the casing 9, in an obvious manner.

A modified form of container, illustrated in Figure 4 of the drawing, comprising a frame 39, having a top member 40 and bottom cup or spider member 41 connected together and spaced apart by a series of tie rods 42. This frame serves to support a glass bottle 43, of any desired shape, having an open upper end 44. The bottle 43 is positioned within a protector tube or casing 45, and a valve 46, slidably mounted on the tie rods 42, is suspended from the lower end of the holding and opening line 21. The top 40 of the frame 39 is attached to and suspended from the lower end of the hoisting line 16. The frame and bottle are lowered into the tank, in the same manner as the preferred form of my invention. When the desired stratum of gasoline is reached drum 19 is locked and, the hoisting line 16 is dropped slightly by the clockwise rotation of crank 13 and drum 14, so that the open upper end 44 is lowered out of sealing engagement with the valve 46 and gasoline flows through the opening and fills the bottle. The hoist line 16 is then wound upon its drum 14 until the open mouth 44 of the bottle is elevated into sealing position against the stationary valve 46. Drum 19 is then unlocked and the frame is removed from the tank by further clockwise rotation of shaft 13.

While I have shown preferred and modified forms of my invention, it is to be understood that numerous changes and improvements may be made without departing from the scope and spirit of the appended claims.

Having thus described my invention, what I claim is:

1. In combination with a liquid storage tank having an opening therein and a valve for said opening, a tubular housing adapted to be positioned in said opening and moved downwardly through the valve therein to open the same, a shaft in said housing having a hoisting and lowering drum keyed thereon, a cable secured at one end to said drum, and a second drum on said shaft and operable with said first mentioned drum and having a cable secured thereto, a single means for actuating said drums, a container attached to the free end of said hoisting and lowering cable and adapted to be lowered into and raised from said tank, valves in the upper and lower ends of said container connected to and operable by said hoisting cable, said container being connected to said second cable whereby the container is suspended in position to permit of the entry of liquid through said valves into and the filling of the container.

2. In combination with a liquid storage tank having an opening in the upper end thereof and a valve for said opening, a tubular housing having an open lower end adapted to be positioned in said opening and moved downwardly through the valve therein to open the same, a shaft journalled in said housing having a flanged hoisting and lowering drum keyed thereon, a cable secured at one end to said drum, and a second drum freely mounted on said shaft having a flange frictionally engageable with and operable with the flange on said first mentioned drum whereby movement of one drum is transmitted to the other, and said second drum having a second cable secured thereto, means for locking said second drum to the housing, a single means for selectively or simultaneously actuating said drums, a container attached to the free end of said hoisting and lowering cable and adapted to be lowered into and raised from said tank, valves in the upper and lower ends of said container connected to and operable by said hoisting cable, said container being connected to said second cable whereby the container is suspended in position when said hoisting and lowering drum is rotated independently to lower said upper and lower valves to permit of the entry of liquid through said valves into and the filling of the container.

CHARLES SPAETH.